United States Patent [19]

Wright et al.

[11] Patent Number: 5,226,670

[45] Date of Patent: Jul. 13, 1993

[54] VEHICLE SAFETY APPARATUS

[75] Inventors: Eric W. Wright, Warren; John P. Wallner, Rochester Hills, both of Mich.

[73] Assignee: TRW Vehicle Safety Systems Inc., Lyndhurst, Ohio

[21] Appl. No.: 832,938

[22] Filed: Feb. 10, 1992

[51] Int. Cl.5 ............................................. B60R 21/30
[52] U.S. Cl. .................................... 280/738; 280/732
[58] Field of Search ............... 280/728, 732, 730, 738, 280/743

[56] References Cited

U.S. PATENT DOCUMENTS

| | | | |
|---|---|---|---|
| 3,791,669 | 2/1974 | Hamilton | 280/738 |
| 3,938,826 | 2/1976 | Giorgini et al. | 280/738 |
| 4,698,107 | 10/1987 | Goetz et al. | 280/728 X |
| 4,817,828 | 4/1989 | Goetz . | |
| 4,842,300 | 6/1989 | Ziomek et al. | 280/732 |
| 4,915,410 | 4/1990 | Bachelder | 280/732 |
| 5,087,071 | 2/1992 | Wallner et al. | 280/732 X |

Primary Examiner—Mitchell, David M.
Assistant Examiner—Gary C. Hoge
Attorney, Agent, or Firm—Tarolli, Sundheim & Covell

[57] ABSTRACT

An apparatus for inflating a vehicle occupant restraint such as an air bag comprises a source of gas for inflating the vehicle occupant restraint, a housing for mounting to the vehicle, and means connecting the gas source to the housing. The housing has passages to enable aspiration of ambient air into the vehicle occupant restraint. An aspiration flap disposed within the housing has a first position closing the passages and a second position enabling flow of ambient air through the passages. The aspiration flap and the housing have interengaging portions for blocking movement of the aspiration flap out of the housing.

12 Claims, 3 Drawing Sheets

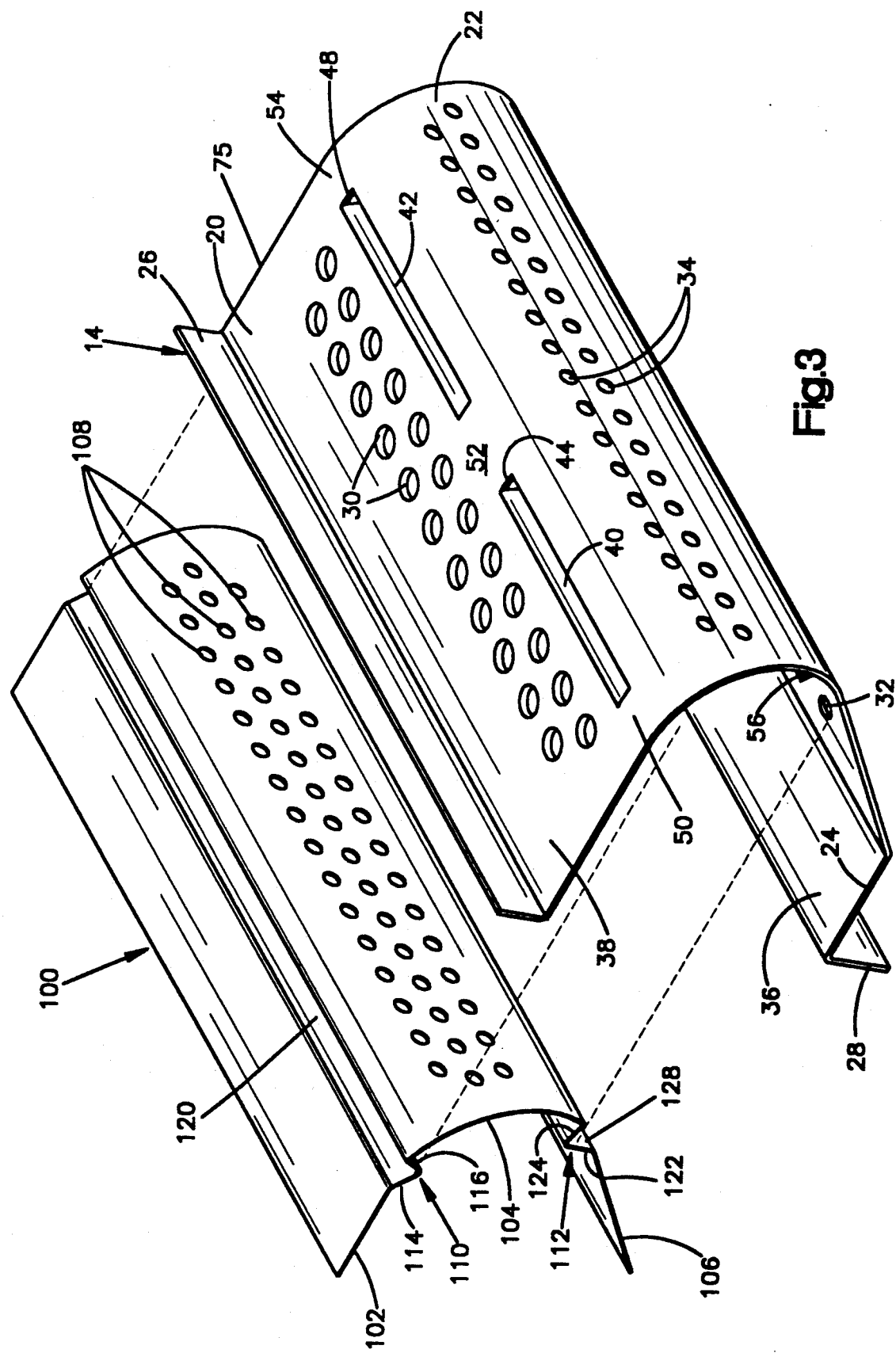

VEHICLE SAFETY APPARATUS

BACKGROUND OF THE INVENTION

1. Technical Field

The present invention relates to an apparatus for inflating an air bag to restrain movement of a vehicle occupant during a collision.

2. Description of the Prior Art

A known vehicle safety apparatus includes an inflator for inflating an air bag to restrain movement of a vehicle occupant in the event of sudden deceleration such as occurs during a collision. The inflator and air bag are located in a housing attached to the vehicle. An aspiration flap located between the inflator and the housing covers a series of ambient air openings in the housing.

When the inflator is actuated, gas under pressure is directed from the inflator into the air bag to inflate the air bag. The flow of gas from the inflator into the air bag causes the aspiration flap to be moved to a position in which the ambient air openings are uncovered. Ambient air is drawn in through the ambient air openings to augment the gas generated by the inflator. Any excess gas generated by the inflator which is not needed to inflate the air bag is exhausted through excess gas openings in the inflator and in the housing to the interior of the vehicle.

In the known vehicle safety apparatus, the aspiration flap is secured to the housing by a fastener extending from the inflator through the aspiration flap and the housing. The fastener clamps the aspiration flap between the housing and the inflator. Thus, the inflator and the aspiration flap must be aligned carefully with the housing in order to fasten them together. Also, the inflator is in heat transferring relationship with the housing through the aspiration flap. Therefore, heat generated during actuation of the inflator can travel directly into the housing.

SUMMARY OF THE INVENTION

The present invention is an apparatus for inflating a vehicle occupant restraint such as an air bag. The apparatus comprises a source of gas for inflating the air bag, a housing for mounting to the vehicle, and means connecting the gas source to the housing. The housing has passage means to enable aspiration of ambient air into the air bag. An aspiration flap disposed within the housing has a first position closing the passage means and a second position enabling flow of ambient air through the passage means. The aspiration flap and the housing have interengaging portions for blocking movement of the aspiration flap out of the housing.

Because the aspiration flap and the housing have interengaging portions, no fastener is needed to secure the aspiration flap in the housing, and assembly of the aspiration flap and gas source to the housing is simplified. In a preferred embodiment of the invention, the gas source is spaced from the housing, and the aspiration flap prevents the mixing of inflation gas and any excess gas. Because there is minimal contact between the gas source and the housing, heat generated during actuation of the gas source does not travel directly into the housing.

BRIEF DESCRIPTION OF THE DRAWINGS

The foregoing and other features of the present invention will become apparent to one of ordinary skill in the art from reading the following description of a preferred embodiment of the invention with reference to the accompanying drawings, wherein:

FIG. 3 is a perspective view of parts of the apparatus of FIG. 1.

DESCRIPTION OF PREFERRED EMBODIMENT

Figure 1:
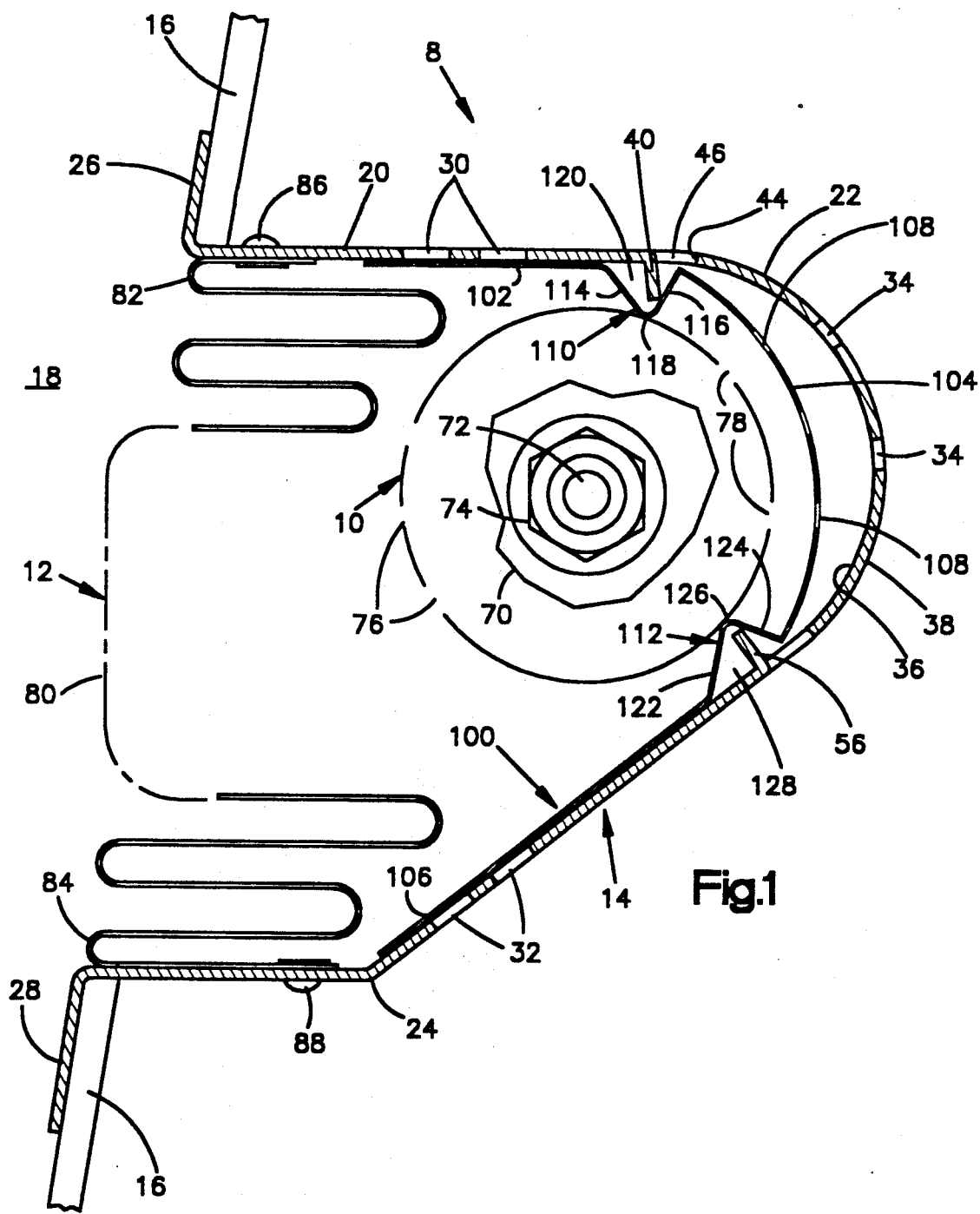
FIG. 1 is a schematic partial sectional view of a vehicle occupant safety apparatus embodying the present invention.

The present invention relates to an apparatus for inflating a vehicle occupant restraint such as an air bag to protect a passenger of a vehicle during sudden vehicle deceleration such as occurs when the vehicle is involved in a collision. The present invention is applicable to various inflator and air bag constructions. As representative of the present invention, FIG. 1 illustrates a vehicle occupant restraint module 8 including an inflator 10 (illustrated schematically) for inflating an air bag 12. The inflator 10 is generally of the type disclosed in U.S. Pat. No. 4,817,828. The inflator 10 and the air bag 12 are located in a housing 14 which is mounted in the instrument panel 16 of a vehicle.

Upon the occurrence of sudden vehicle deceleration, such as occurs in a collision, the inflator 10 is actuated and a volume of gas is directed from the inflator 10 into the air bag 12. The gas from the inflator 10 expands the air bag 12. As the air bag 12 expands, it moves from a folded condition shown in FIG. 1 to an inflated condition shown in FIG. 2. When the air bag 12 is in the inflated condition, it extends rearward, relative to the vehicle, from the housing 14 into the vehicle occupant compartment 18 to restrain forward movement of a vehicle occupant toward the instrument panel 16.

The housing 14 (FIGS. 1 and 3) includes a generally planar upper portion 20, a curved central portion 22, and a lower portion 24. A flange 26 attaches the upper portion 20 to the instrument panel 16. A flange 28 attaches the lower portion 24 to the instrument panel 16.

The housing 14 has a plurality of ambient air flow openings 30 in the upper portion 20, and a plurality of ambient air flow openings 32 in the lower portion 24. The housing 14 also has a plurality of excess gas flow openings 34 in the central portion 22. The openings 30, 32 and 34 extend between the inner surface 36 and the outer surface 38 of the housing 14.

A pair of longitudinally extending locating tabs 40 and 42 are formed in the upper portion 20 of the housing 14. To form the tab 40, the metal of the upper portion 20 is cut along a three-sided edge surface 44. The tab 40 is bent downwardly out of the plane of the upper portion 20 and projects into the interior of the housing 14 toward the inflator 10, thereby forming an opening 46. To form the tab 42 the metal of the upper portion 20 is cut along a three-sided edge surface 48. The tab 42 is bent downwardly out of the plane of the upper portion 20 and projects into the interior of the housing 14 toward the inflator 10.

The tabs 40 and 42 are similar to each other in size and shape and are aligned with each other on the upper portion 20 of the housing 14. The tab 40 extends between a side bridge portion 50 of the housing 14 and a central bridge portion 52. The tab 42 extends between the central bridge portion 52 and a side bridge portion 54.

A second pair of locating tabs are formed in the lower portion 24 of the housing 14 at locations corresponding to the locations of the tabs 40 and 42. Only one tab, i.e., the tab 56, is visible in the drawings. The tab 56 is bent inwardly out of the plane of the lower portion 24 of the housing 14 and projects into the interior of the housing toward the inflator 10. The other tab (not shown) in the lower portion 20 is similar in size and shape and is aligned with the tab 56.

The inflator 10 (FIGS. 1 and 2) has an elongated cylindrical shape. The inflator 10 is secured at one end to an end panel 70 of the housing 14 which is shown partially in FIG. 1. The end panel 70 extends between the portions 20, 22 and 24 of the housing 14 at the left end (as viewed in FIG. 3) of the housing. A threaded projection 72 of the inflator 10 is secured by a nut 74 to the end panel 70. The opposite end of the inflator 10 is connected to a similar end panel at the opposite end 75 (FIG. 3) of the housing 14. The inflator 10 has a plurality of inflation gas openings 76 (FIG. 1) facing toward the air bag 12. The inflator 10 also has a plurality of excess gas openings 78 facing the central portion 22 of the housing 14.

The air bag 12 (FIGS. 1 and 2) includes a central portion 80 extending between two end portions 82 and 84. The end portion 82 is secured with fasteners 86 to the upper portion 20 of the housing 14. The end portion 84 is secured with fasteners 88 to the lower portion 24 of the housing 14. The air bag 12 is folded within the housing 14.

An aspiration flap 100 is disposed between the inflator 10 and the housing 14. The aspiration flap 100 includes an upper portion 102, a central portion 104, and a lower portion 106. A plurality of excess gas flow openings 108 extend through the central portion 104 of the aspiration flap 100. The aspiration flap 100 is imperforate except for the openings 108.

A pair of ribs 110 and 112 are formed in the aspiration flap 100. The ribs 110 and 112 extend longitudinally along the aspiration flap 100 and inwardly toward the inflator 10. The rib 110 is disposed between the upper portion 102 and the central portion 104 of the flap 100. The rib 112 is disposed between the central portion 104 and the lower portion 106 of the aspiration flap 100.

The rib 110 includes a portion 114 extending at an angle to the upper portion 102 of the flap 100. The rib 110 also includes a portion 116 extending from the central portion 104 of the flap 100. The rib portions 114 and 116 intersect at a corner 118 and define between them a recess 120 within which are located the tabs 40 (FIG. 1) and 42 of the housing 14.

The rib 112 includes a portion 122 extending at an angle to the lower portion 106 of the flap 100. The rib 112 has a portion 124 extending from the central portion 104 of the flap 100. The rib portions 122 and 124 intersect at a corner 126, and define between then a recess 128 within which are disposed the lower tabs including the tab 56 (FIG. 1) of the housing 14.

The aspiration flap 100 is a single sheet of material, preferably tempered aluminum with a thickness of about 0.010 inches. The aspiration flap may also be made of another metal, a plastic, or a composite material. The aspiration flap 100 is dimensioned so that it will snap into place within the housing 14, with the tabs of the housing disposed in the recesses defined by the ribs 110 and 112 of the aspiration flap.

Figure 2:
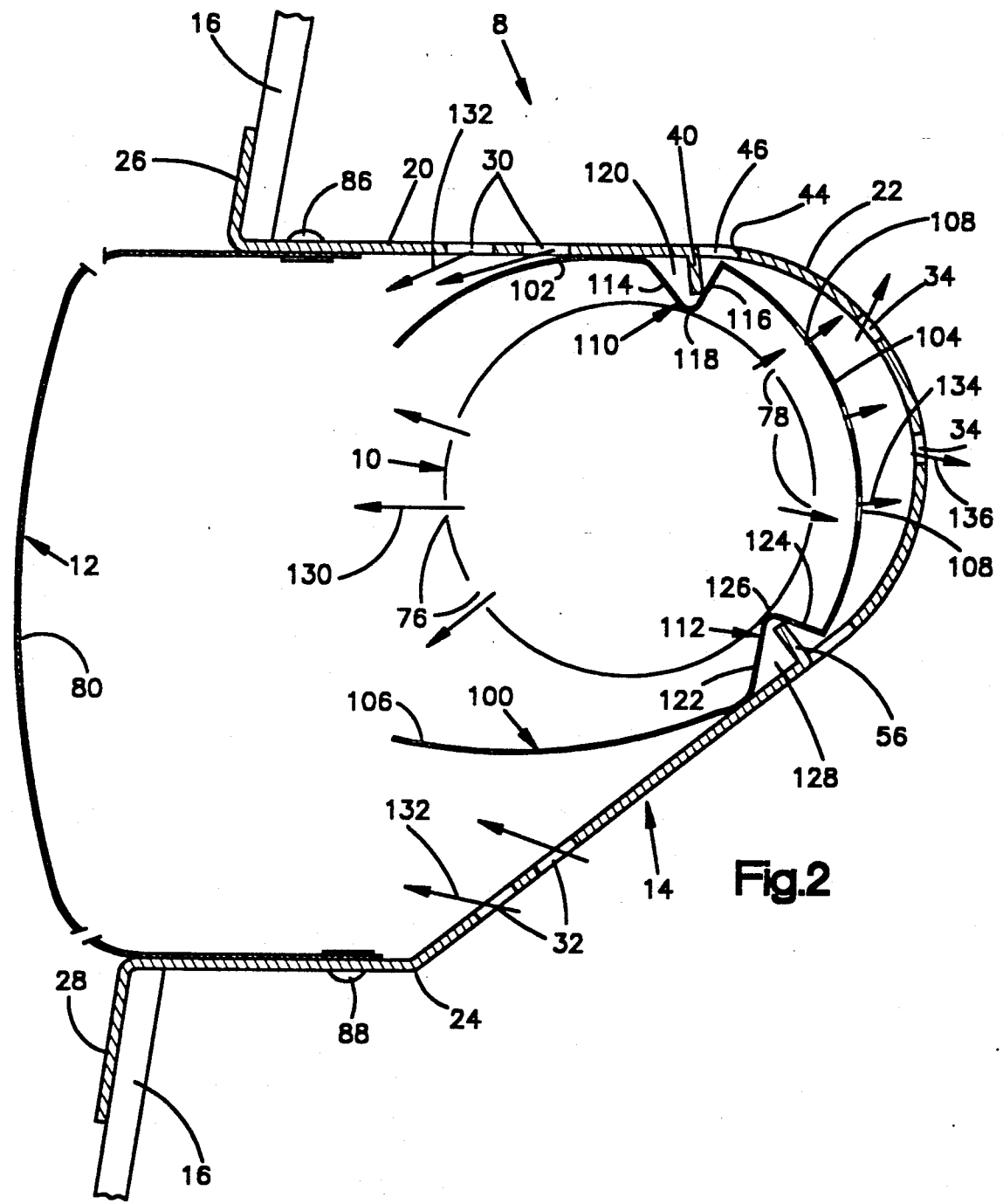
FIG. 2 is a view of the apparatus of FIG. 1 illustrating inflation of the air bag.

In assembly of the module 8, prior to installation of the inflator 10, the aspiration flap 100 is bent into a tubular shape and inserted into the housing 14 in a direction from the left as viewed in FIGS. 1 and 2. The central portion 104 of the aspiration flap is inserted through the passage defined between the upper and lower tabs of the housing 14. The aspiration flap 100 is released and its upper and lower portions 102 and 106 spring back against and are biased outwardly into engagement with the upper and lower portions 20 and 24, respectively, of the housing 14. The upper portion 102 of the aspiration flap 100 covers the ambient air openings 30 in the upper portion 20 of the housing 14. The lower portion 106 of the aspiration flap 100 covers the ambient air flow openings 32 in the lower portion 24 of the housing 14.

The ribs portions 116 and 124 are also biased outwardly into interlocking engagement with the tabs on the housing 14. The tab 40 is disposed in the recess 120 inside the rib 110. The tab 56 is disposed in the recess 120 within the rib 112. The central portion 104 of the aspiration flap 100 is disposed behind the tabs 40, 42 and 56 of the housing 14. The excess gas flow openings 108 in the central portion 104 of the aspiration flap 100 are disposed between the excess gas flow openings 78 of the inflator 10 and the excess gas flow openings 38 of the housing 14.

When the vehicle in which the inflator 10 is mounted experiences sudden deceleration, such as occurs in a collision, vehicle circuitry including a collision sensor (not shown) actuates the inflator 10. Gas from the inflator 10 flows rapidly outwardly through the gas flow openings 76 in the inflator 10 and in a first direction as indicated by the arrows 130 in FIG. 2 into the air bag 12. The flow of inflation gas from the inflator 10 toward the air bag 12 causes a reduction in pressure inside the housing 14 adjacent to the upper and lower portions 102 and 106, respectively, of the aspiration flap 100. The reduction in pressure inside the housing 14 causes ambient air outside the housing to flow inwardly through the ambient air openings 30 and 32 and past the flap portions 102 and 106, as indicated by the arrows 132 in FIG. 2. The ambient air mixes with the inflation gas in the housing 14, and cools the gas. The ambient air also adds to the gas flowing into the air bag 12 from the inflator 10, and thus reduces the amount of gas which must be provided by the inflator.

Under certain circumstances, for example when the ambient temperature is high, not all the gas generated by the inflator 10 is needed to inflate the air bag 12. The construction of the inflator 10 is such that this excess gas is directed radially outwardly through the excess gas flow openings 78 in the inflator 10 in a second direction, away from the air bag 12 and toward the central portion 104 of the aspiration flap 100. The excess ga flows radially outwardly through the excess gas openings 108 in the aspiration flap 100, as indicated by the arrows 134. The excess gas then is exhausted to the interior of the vehicle through the excess gas openings 34 in the central portion 32 of the housing 14, as indicated by the arrows 136.

The ribs 110 and 112 block mixing of this excess gas with the inflation gas intended to be directed into the air bag 12. The corner 118 of the rib 110 of the aspiration flap 100 engages the cylindrical outer surface of the inflator 10. Similarly, the corner 126 of the rib 112 of the aspiration flap 100 also engages the cylindrical outer surface of the inflator 10. The ribs 110 and 112 thus block mixing of gas intended to be directed into the air bag 12 with excess gas intended to be vented out of the housing 14 through the openings 108 and 34.

No fasteners are needed to maintain the aspiration flap 100 in location within the housing 14. The aspiration flap 100 biases itself into position within the housing 14. The central portion 104 of the aspiration flap 100 is larger than the passage defined between the opposed sets of tabs on the upper and lower portions 20 and 24, respectively, of the housing 14. The aspiration flap 100 and the housing 14 have interengaging portions, i.e., the ribs 110 and 112 and the tabs 40, 42 and 56, which block movement of the aspiration flap out of position within the housing.

From the above description of the invention, those skilled in the art will perceive improvements, changes and modifications in the invention. For example, although the housing 14 is illustrated as a separate component that is attached to the instrument panel 16, the housing could be molded, stamped, or otherwise formed in one piece with the instrument panel. Such improvements, changes and modifications within the skill of the art are intended to be covered by the appended claims.

We claim:

1. Apparatus for inflating a vehicle occupant restraint, said apparatus comprising:
    a source of gas for inflating the vehicle occupant restraint;
    a housing for mounting to the vehicle, said housing having passage means for enabling aspiration of ambient air into the vehicle occupant restraint;
    means for connecting said gas source to said housing; and
    an aspiration flap disposed with said housing and having a first position closing said passage means and a second position enabling flow of ambient air through said passage means;
    said housing having surfaces defining an opening in said housing through which said aspiration flap is inserted into said housing,
    said housing having means for blocking movement of said aspiration flap out of said housing through the housing opening, said means for blocking movement comprising a portion of said housing in overlapping engagement with a portion of said aspiration flap.

2. Apparatus as defined in claim 1 wherein said housing includes means projecting toward said gas source for defining a passage, said aspiration flap having a portion larger than said passage and disposed behind said projecting means to block movement of said aspiration flap out of said housing.

3. Apparatus as defined in claim 1 wherein said aspiration flap is resilient and has portions biased into said first position closing said passage means.

4. Apparatus as defined in claim 1 wherein said gas source has a plurality of inflation gas flow openings for directing inflation gas in a first direction from said gas source into the vehicle occupant restraint and a plurality of excess gas flow openings for directing excess gas in a second direction from said gas source away from the vehicle occupant restraint, said aspiration flap having blocking portions blocking mixing of the inflation gas and the excess gas.

5. Apparatus for inflating a vehicle occupant restraint, said apparatus comprising:
    a source of gas for inflating the vehicle occupant restraint;
    a housing for mounting to the vehicle, said housing having passage means for enabling aspiration of ambient air into the vehicle occupant restraint;
    means for connecting said gas source to said housing; and
    a resilient aspiration flap disposed within said housing and having a first position closing said passage means and a second position enabling flow of ambient air through said passage means;
    said housing having surfaces defining an opening in said housing through which said aspiration flap is inserted into said housing,
    said resilient aspiration flap having means for blocking movement of said aspiration flap out of said housing through the housing opening, said means for blocking movement comprising a portion of said resilient aspiration flap biased into overlapping engagement with a portion of said housing.

6. Apparatus as defined in claim 5 wherein said housing includes means projecting toward said gas source for defining a passage, said aspiration flap having a portion with a dimension larger than said passage and disposed behind said projecting means to block movement to said aspiration flap out of said housing.

7. Apparatus as defined in claim 5 wherein said gas source has a plurality of inflation gas flow openings for directing inflation gas in a first direction from said gas source into the vehicle occupant restraint and a plurality of excess gas flow openings for directing excess gas in a second direction from said gas source away from the vehicle occupant restraint, said gas source being spaced from said housing by a distance greater than the thickness of said aspiration flap and said aspiration flap portions extending across the space between said gas source and said housing and engaging an outer surface of said gas source to block mixing of the inflation gas and the excess gas.

8. Apparatus for inflating a vehicle occupant restraint, said apparatus comprising:
    a source of gas for inflating the vehicle occupant restraint;
    a housing for mounting to the vehicle, said housing having passage means for enabling aspiration of ambient air into the vehicle occupant restraint;
    means for connecting said gas source to said housing; and
    an aspiration flap disposed within said housing and having a first position closing said passage means and a second position enabling flow of ambient air through said passage means;
    said aspiration flap and said housing having interengaging portions for blocking movement of said aspiration flap out of said housing;
    wherein said aspiration flap comprises a single sheet of material having a plurality of ribs and said housing includes a plurality of tabs, said tabs on said housing engaging said ribs on said aspiration flap.

9. Apparatus as defined in claim 8 wherein said ribs extend longitudinally and inwardly on said aspiration flap and said tabs extend inwardly toward said gas source, said tabs being disposed within said ribs.

10. Apparatus for inflating a vehicle occupant restraint, said apparatus comprising:
    a source of gas for inflating the vehicle occupant restraint;
    a housing for mounting to the vehicle, said housing having passage means for enabling aspiration of ambient air into the vehicle occupant restraint;

means for connecting said gas source to said housing; and an aspiration flap disposed within said housing and having a first position closing said passage means and a second position enabling flow of ambient air through said passage means;

said aspiration flap and said housing having interengaging portions for blocking movement of said aspiration flap out of said housing;

wherein said gas source has a plurality of inflation gas flow openings for directing inflation gas in a first direction from said gas source into the vehicle occupant restraint and a plurality of excess gas flow openings for directing excess gas in a second direction from said gas source away from the vehicle occupant restraint, said aspiration flap having portions blocking mixing of the inflation gas and the excess gas; and wherein said aspiration flap portions comprise a plurality of ribs engaging an outer surface of said gas source for blocking mixing of the inflation gas and the excess gas.

11. Apparatus for inflating a vehicle occupant restraint, said apparatus comprising:

a source of gas for inflating the vehicle occupant restraint;

a housing for mounting to the vehicle, said housing having passage means for enabling aspiration of ambient air into the vehicle occupant restraint;

means for connecting said gas source to said housing; and a resilient aspiration flap disposed within said housing and having a first position closing said passage means and a second position enabling flow of ambient air through said passage means, said aspiration flap having portions biased into an interlocking condition with said housing;

wherein said housing comprises a first portion projecting inwardly toward said gas source and said aspiration flap comprises a first rib portion biased into an interlocking condition with said first projecting portion of said housing.

12. Apparatus as defined in claim 11 wherein said housing comprises a second portion projecting inwardly toward said gas source at a location on said housing spaced from said first projecting portion and said aspiration flap comprises a second rib portion biased into an interlocking condition with said second projecting portion of said housing.

* * * * *

UNITED STATES PATENT AND TRADEMARK OFFICE
CERTIFICATE OF CORRECTION

PATENT NO. : 5,226,670
DATED      : July 13, 1993
INVENTOR(S): Eric W. Wright and John P. Wallner It is certified that error appears in the above-indentified patent and that said Letters Patent is hereby corrected as shown below:

Column 6, line 24, delete "to" and insert -- of --.

Signed and Sealed this

First Day of March, 1994

Attest:

BRUCE LEHMAN

Attesting Officer

Commissioner of Patents and Trademarks